3,259,583
HYDRAULIC FLUID
Stanley R. Sprague, East Alton, Ill., and Richard G. Cunningham, University Park, Pa., assignors to Shell Oil Company, New York, N.Y., a corporation of Delaware
No Drawing. Filed Dec. 18, 1962, Ser. No. 245,375
3 Claims. (Cl. 252—75)

This invention relates to improved power transmission fluids and lubricants. More particularly it relates to a new power transmission fluid which meets requirements for various types of transmission fluid such as Type A transmission fluids, transaxle fluid and rear axle fluid and is also applicable in various other mechanical equipment.

Rigorous requirements hav been set up to qualify fluids for this service. These include wide temperature stability at both high and low temperatures and a pour point of −40° F. maximum to insure proper pumpability and fluidity at low temperatures. The fluid must not have a detrimental effect on parts with which it comes in contact, such as metal surfaces, e.g., copper and solid organic surfaces such as rubber, organic resins and the like. The fluid must possess excellent anti-frictional and extreme pressure characteristics to afford proper lubrication of gears, clutch plates and other parts of automotive equipment. The fluid must not cause chattering, squawking, squealing or produce other noises caused by the stick-slip phenomenon of clutch plates or other parts of these mechanisms. The fluid must be foam resistant, must not damage elastomer seals by swelling, shrinking or hardening them, it must not be effected by foreign matter or water contamination and should be miscible with various available transmission fluids.

Now, in accordance with the present invention, a multifunctional power transmission fluid is provided which meets the above requirements and which comprises of a major amount of a high viscosity index (80–100 VI) mineral oil in the viscosity range of from about 45 to about 150 SUS at 100° F., preferably between 80 and 100 SUS at 100° F. and containing minor, but critical, amounts of an essential additive mixture which produces unexpected results other than are attributable to the individual additives, which combination of additives in mineral oil produces the effective and superior power transmission fluid of the present invention. The essential additives are: (1) a high basic oil-soluble polyvalent metal organic sulfonate, e.g. alkaline earth metal salt of organic sulfonic acids, e.g. oil-soluble petroleum sulfonic acid; (2) polyaryl polyamine having the formula

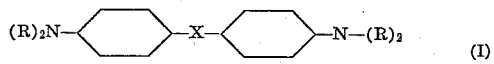

(I)

where X is oxygen, sulfur, or a methylene radical and R is a $C_{1-8}$ alkyl radical such as methyl, ethyl, propyl, isopropyl, butyl, isobutyl, t-butyl, amyl, hexyl, octyl radical and (3) zinc salt of an unsaturated fatty acid having from 12 to 18 carbon atoms. The combination of these three additives unexpected results as for example none of these materials alone possess anti-frictional properties and yet in combination they are excellent friction inhibitors. Also alone these additives cause swelling and other damage to elastomer seals and clutch plate materials but in combination they provide excellent protection for such materials. Additionally these materials in combination function synergistically with respect to detergency, oxidation stability and the like. Also oxidation and dispersancy life of transmission fluids of this invention are improved far beyond the expectancy of the additive combination as described.

The oil-soluble basic polyvalent metal organic sulfonates, known as dispersants and detergents. By highly basic sulfonate is meant that the amount of neutralizing agent used as far in excess, namely, in the range of from 20 to 1000% and preferably between 40 and 800% in excess of that normally required to neutralize the acid to produce the normal salt.

The basic sulfonates can be derived from any suitable material and prepared by any of the well-known methods. Preferred materials for making sulfonates include liquid petroleum fractions, alkyl substituted aromatic compounds and alkyl substituted polar-containing aromatic compounds. Although various basic metal sulfonates are contemplated for use in compositions of this invention, the basic sulfonates of the metals of Group II of the Periodic Table having an atomic number of from 12 to 56 inclusive, are preferred, and especially the alkaline earth metals (Ca, Ba, Mg, or Sr) within that group of metals. Specific basic sulfonates which are useful in compositions of this invention include basic calcium, barium, magnesium and/or strontium, petroleum sulfonates of oil-soluble petroleum sulfonic acid, tetra-tertiarybutyl-naphthalene sulfonates, diwaxbenzene sulfonate, stearyl benzene sulfonate, diwaxnaphthalene sulfonate, ditertiary amyl phenol sulfonate and mixtures thereof.

The second essential additive of the present invention which is represented by Formula I includes the (a) N,N′-bis(dialkyl aminophenyl)methane and (b) N,N′-bis(dialkyl aminophenyl)ether or thioether. The compounds of I(a) can be prepared by suitable means such as by reacting N,N′-dialkyl aniline in an acid medium and adding formaldehyde to the reaction at low temperature of below 40° C. and thereafter allowing the reaction to raise to 60–150° C. for several hours after which the end product is recovered. In the reaction it is preferred that an excess of 40–100% of the amine be used. Thus, N,N′-bis(dimethyl aminophenyl)methane (Ex. I) is prepared by adding 3 moles of N,N′-dimethyl aniline and 1 mole of formaldehyde (10% solution) to hydrochloric acid at 60–75° C. and the mixture heated for 1–2 hours after which the end product was recovered. Other examples include: N,N′-(diethyl aminophenyl)methane, N,N′-bis(dipropyl aminophenyl)methane, N,N′-bis(dibutyl aminophenyl)methane, N,N′-bis(ditert.butyl amino–phenyl) methane, N,N′-bis(diamyl aminophenyl)methane, N,N′-bis(dioctyl aminophenyl)methane. The ether or thio-ethers of I(b) include N,N′-bis(dimethyl aminophenyl) ether, N,N′-bis(diethyl aminophenyl)ether, N,N′-bis(dipropyl aminophenyl)ether, N,N′-bis(ditert.butyl aminophenyl)ether, N,N′-bis(dioctyl aminophenyl)ether and their thioether derivatives. Preferred compounds are N,N′-bis(ditert.butyl phenyl)ether and N,N′-bis(ditert. butyl phenyl)methane.

The third essential additive of this invention is a zinc salt of a $C_{12-18}$ unsaturated fatty acid such as zinc oleate, zinc linoleate, zinc ricinoleate.

The zinc salt normally added to oils as a thickening agent in compositions of the present invention imparts unexpected anti-friction and anti-wear properties as well as aid in improving the stability of the oil composition and helps protect the electromers and clutch plate facings of the transmission system.

The additive (1) is used in amounts of 5–15% preferably 6–12% by weight, while additives (2) and (3) are each used in amounts of 0.1–1%, preferably 0.2–0.6% by weight.

The base oil is a high VI mineral oil in the viscosity range of 45 to 150 SUS at 100° F. It should be highly refined and essentially free of naturally occurring sulfur and nitrogen-containing compounds as well as olefinic materials but rich in aromatics, namely the oil should contain 5–15% aromatic hydrocarbons, predominantly polyaromatics such as alkylated naphthalene and anthracene. Mineral oil particularly useful are high 80–100 VI mineral oils having a viscosity of 80–100 SUS at 100° F. or a spray base oil of 60 SUS at 100° F. or mixture thereof.

If desired, minor amounts of secondary additives can be used in conjunction with the three essential additives among which are included sulfurized and/or sulfurized-phosphorized fatty oils and derivatives thereof such as the free fatty acids, e.g. sulfurized sperm oil, sulfurized lard oil, sulfurized tallow, sulfurized oleic acid, sulfurized-phosphorized sperm oil. Also useful are organo sulfides, such as alkyl, alkaryl, aralkyl, cycloalkyl mono- or disulfide such as amyl, octyl, lauryl, stearyl, butylphenyl, benzyl, cyclohexyl mono- or disulfides, reaction products of phosphorus sulfide and monohydroxy alcohols, olefins, terpenes and metal salts thereof, such as reaction product of $P_2S_5$-terpene sold commercially by Monsanto as Santolube 394–C, the properties of which are: viscosity at 210° F., 145 SUS; specific gravity, 103; phosphorus, 4.75%; sulfur, 12.5%. Zinc or calcium or barium dialkyldithiophosphates derived from alkanols such as methylisobutylcarbinol, isobutyl alcohol, 2-methyl-1-butanol, 3-pentanol and mixtures thereof. Preferred are the zinc dialkyldithiophosphates sold by Lubrizol as Lubrizol 1060 and 1360, the properties of which are:

|  | Lubrizol 1060 | Lubrizol 1360 |
|---|---|---|
| Phosphorus, percent, w | 8 | 8 |
| Sulfur, percent, w | 16.6 | 17.0 |
| Zinc | 8.3 | 8.7 |

Antifoaming agents such as silicone polymers, aryl phosphates e.g. di and tricresyl phosphates, alkyl phosphate, esters, e.g. dimethylsilicone polymer, tributyl phosphate and phenolic antioxidants can be incorporated into compositions of the present invention, such as alkyl phenols, e.g. di- and trialkyl phenols, for instance, 2,4-, 2,3- 3,4- 2,6- and 3,5-diamyl phenol 2,5-dimethyl-6-tert-butyl phenol, 2,4-ditert-butyl-6-methyl phenol; fatty acids of from 10 to 20 carbon atoms such as lauric, palmitic or stearic acids, viscosity index and pour point depressants such as oil-soluble nitrogen-free polymethacrylates e.g. copolymers of octyl and lauryl methacrylates available under the name "Acryloids 150, 618, 710, 768" described in U.S. Patent 2,710,842 and mixtures thereof. These auxiliary agents when used in compositions of this invention are employed in amounts of from 0.001% to 10% and preferably between 0.1% and 5%.

The following compositions illustrate the invention:

Composition A: Percent wt.
Basic Ca petroleum sulfonate (40% excess base) _____ 10
N,N'-bis(ditert.butyl aminophenyl)ether _____ 0.5
Zinc oleate _____ 0.25
Mineral oil (MVI 100 SUS at 100° F.), essentially balance.

Composition B:
Basic Ca petroleum sulfonate (40% excess base) _____ 10
N,N'-bis(ditert.butyl aminophenyl)methane ___ 0.5
Zinc oleate _____ 0.25
Mineral oil (MVI 100 SUS at 100° F.), essentially balance.

Composition C:
Basic Ca petroleum sulfonate (40% excess base) _____ 10
N,N'-bis(ditert.butyl aminophenyl)ether _____ 0.5
Zinc oleate _____ 0.25
Sulfurized sperm oil _____ 2
Mineral oil (MVI 100 SUS at 100° F.), essentially balance.

Composition D:
Basic Ca petroleum sulfonate (40% excess base) _____ 10
N,N'-bis(ditert.butyl aminophenyl)methane ___ 0.5
Zinc oleate _____ 0.25
Sulfurized sperm oil _____ 2
Mineral oil (MVI 100 SUS at 100° F.), essentially balance.

Composition E:
Basic Ca petroleum sulfonate (40% excess base) _____ 10
N,N'-bis(ditert.butyl aminophenyl)oxide _____ 0.5
Sulfurized sperm oil _____ 2
Zinc oleate _____ 0.5
Lauryl methacrylate polymer (Acryloid 150) __ 0.3
Dimethyl silicone polymer 1000 cs., 20 p.p.m.
Mineral oil (80 SUS 100° F.), balance.

Compositions A–E met all physical and performance requirements for Type 2 V-Drive, Type A, Suffix A and Type C transmission fluids, the requirements for each being as follows:

AUTOMATIC TRANSMISSION FLUID—PHYSICAL AND PERFORMANCE PROPERTIES

| Property | Type 2, V-Drive | Type A, Suffix A | Type C |
|---|---|---|---|
| Viscosity at 210° F., S.S.U. | 37–45 | 49 minimum | 45 minimum. |
| High-Temp. Properties Flash Point, ° F. | 325–375 | 320 minimum | Not specified. |
| Thermal Stability | 300 hr. at 275° F. in Powerglide. | (a) 300 hr. at 275° F. in Powerglide (b) 125 hr. in oven at 250° F. | 300 hr. at 325° F. in Powerglide. |
| Low-Temperature Properties Pour Point. | −10° F. max | 64,000 cp. max. vis. at −40° F. in Brookfield viscometer. | −20° F. max. |
| Oxidation Stability Bench Oxidation Test. | Not required | Not required | <15% vis. increase after 150 hrs. at 300° F. |
| Anti-wear | Pass CRC L-39 Powerglide. | Pass lab cycling test in Hydramatic transmission. | Pass power steering pump test (<0.004% vane weight loss). |
| Rust and Corrosion | Pass Cu strip / Pass humidity | Pass Cu strip / Pass ASTM D-665 | General requirement of no distress with any metal in transmission. |
| Friction Control | No spec. to be met | Pass proving ground test at GM (squawk, slip, shift feel). | No spec. to be met. |
| Rubber Seal Test | 0–10% vol. increase | 0–5% vol. increase | 1–5% vol. increase. |

The compositions were also tested in the Type C Fluid Bench Oxidation Test which involves sustained heating of the test fluid at 300° F. while 8 liters/hour of air is introduced into the sample in the presence of both iron and copper catalysts in the form of coiled wires. The results were as follows:

| Composition: | Oxidation Test (Hr.) |
|---|---|
| A | 360 |
| E | 405 |
| X$^x$ (Mineral oil [1] + 10% Basic Ca petroleum sulfonate + 0.5% N,N' - bis(ditertbutylamino phenyl)ether | 150 |
| Y (Mineral oil + 10% Basic Ca petroleum sulfonate + 0.5% N,N' - bis(ditertbutylamino phenyl)ether + 0.5% Tricresyl phosphate | 160 |
| Z Mineral oil + 0.5% N,N' - bis(ditertbutyl-amino phenyl)ether | 150 |
| XX (Mineral oil + 10% Basic Ca petroleum sulfonate + 0.5%, 4,4' - methylene bis(2,6 - ditert.butyl phenyl) | 192 |

[1] Mineral oil = 80 SUS at 100° F.

Compositions of the present invention are excellent power transmission fluids for various engines and industrial equipment which also possess excellent lubricating and cooling properties.

We claim as our invention:

1. A power transmission fluid consisting essentially of a major amount of mineral oil having a viscosity range of from about 45 to about 150 SUS at 100° F. and a viscosity index of 80–100 and from about 5% to about 15% of an oil-soluble basic alkaline earth metal petroleum sulfonate containing 20% to 1000% excess base normally required to neutralize the petroleum sulfonic acid and from about 0.1% to about 1% each of zinc oleate and N,N'-bis(dialkyl aminophenyl)ether.

2. A power transmission fluid consisting essentially of a major amount of mineral oil having a viscosity range of from about 45 to about 150 SUS at 100° F. and a viscosity index of 80–100 and from about 5% to about 15% of an oil-soluble basic calcium petroleum sulfonate containing 40 to 800% excess base normally required to neutralize the petroleum sulfonic acid and from about 0.1% to about 1% each of zinc oleate and N,N'-bis(ditert.butyl amino-phenyl)ether.

3. A power transmission fluid having the following formula:

| | Percent wt. |
|---|---|
| Oil-soluble basic calcium petroleum sulfonate containing 40% to 800% excess base normally required to neutralize the petroleum sulfonic acid | 10 |
| N,N'-bis(ditert.butyl aminophenyl) ether | 0.5 |
| Zinc oleate | 0.25 |
| Sulfurized sperm oil | 2 |
| Mineral oil having a viscosity range of from about 45 to about 150 SUS at 100° F. and a viscosity index of 80–100, essentially balance. | |

References Cited by the Examiner

UNITED STATES PATENTS

| 2,290,860 | 7/1942 | Burk et al. | 252—402 XR |
| 2,367,264 | 1/1945 | Burk et al. | 252—401 XR |
| 2,710,842 | 6/1955 | Heisig et al. | 252—75 |
| 3,017,361 | 1/1962 | Morris et al. | 252—75 XR |

ALBERT T. MEYERS, *Primary Examiner.*

JULIUS GREENWALD, *Examiner.*

R. D. LOVERING, *Assistant Examiner.*